(12) United States Patent
Kassas et al.

(10) Patent No.: US 11,729,583 B2
(45) Date of Patent: Aug. 15, 2023

(54) SYSTEMS AND METHODS FOR TOA AND DOA ACQUISITION AND TRACKING FOR SIGNAL OF OPPORTUNITY POSITIONING

(71) Applicant: The Regents of the University of California, Oakland, CA (US)

(72) Inventors: Zak Kassas, Irvine, CA (US); Kimia Shamaei, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 186 days.

(21) Appl. No.: 17/237,290

(22) Filed: Apr. 22, 2021

(65) Prior Publication Data

US 2021/0337357 A1  Oct. 28, 2021

Related U.S. Application Data

(60) Provisional application No. 63/013,638, filed on Apr. 22, 2020.

(51) Int. Cl.
*H04W 4/029* (2018.01)
*G01S 5/02* (2010.01)

(52) U.S. Cl.
CPC ........... *H04W 4/029* (2018.02); *G01S 5/0205* (2013.01)

(58) Field of Classification Search
CPC .............................. H04W 4/029; G01S 5/0205
USPC ....................................................... 455/456.1
See application file for complete search history.

(56) References Cited

U.S. PATENT DOCUMENTS

2019/0364390 A1* 11/2019 Kurras .................... H04L 5/005
2020/0264258 A1* 8/2020 Zhang .................. G01S 5/0263

* cited by examiner

*Primary Examiner* — Ted M Wang
(74) *Attorney, Agent, or Firm* — John P. Teresinski; Stites & Harbison PLLC (57) ABSTRACT

Processes and device configurations, including a receiver structure, are provided to jointly estimate the time-of-arrival (TOA) and azimuth and elevation angles of direction-of-arrival (DOA) from signals of opportunity, such as received cellular long-term evolution (LTE) signals. In one embodiment, a matrix pencil (MP) algorithm is used to obtain a coarse estimate of the TOA and DOA. Tracking loop configurations are provided to refine the estimates and jointly track the TOA and DOA changes. One or more solutions are provided for acquisition and tracking in the presence of noise and multipath signals. Processes and devices configurations are provided to use refined estimates to determine position and for use in navigation of a device.

20 Claims, 8 Drawing Sheets
(6 of 8 Drawing Sheet(s) Filed in Color)

SYSTEMS AND METHODS FOR TOA AND DOA ACQUISITION AND TRACKING FOR SIGNAL OF OPPORTUNITY POSITIONING

CROSS REFERENCE TO RELATED APPLICATION

This application claims priority to U.S. Provisional Application No. 63/013,638 titled SYSTEMS AND METHODS FOR TOA AND DOA ACQUISITION AND TRACKING FOR POSITIONING WITH LTE SIGNALS filed on Apr. 22, 2022, the content of which is expressly incorporated by reference in its entirety.

STATEMENT OF GOVERNMENT SUPPORT

This invention was made with Government support under Grant No. N00014-19-1-2511 awarded by the Office of Naval Research. The Government has certain rights in the invention.

FIELD

The present disclosure generally relates to positioning based on signals of opportunity and specifically to time of arrival (TOA) and direction of arrival (DOA) acquisition and tracking for positioning with signals of opportunity, such as cellular long-term evolution (LTE) signals.

BACKGROUND

Global navigation satellite systems (GNSS) have been the main technology used in aerial and ground vehicle navigation systems. As vehicles approach full autonomy, the requirements on accuracy, reliability, and availability of their navigation systems become very stringent. Due to the known limitations of GNSS, namely severe attenuation in deep urban canyons and susceptibility to interference, jamming, and spoofing, alternative sensors and control signals are needed.

There is a desire to exploit ambient radio frequency signals which are not intended for positioning. These signals are commonly referred to as signals of opportunity and include cellular, television, WiFi, and satellite communication signals. Cellular signals are particularly desirable as they possess desirable attributes for positioning, namely: ubiquity, geometric diversity, high received power, and large bandwidth.

The positioning capabilities of cellular long-term evolution (LTE) signals have been investigated. One of the main challenges in opportunistic navigation with LTE signals is the unknown clock biases of the user equipment (UE) and the base stations (also known as evolved Node Bs or eNodeBs). Some approaches to overcome this challenge include: (1) estimating and removing the clock bias in a post-processing fashion by using the known position of the UE, (2) using perfectly synchronized eNodeBs in laboratory-emulated LTE signals, or (3) estimating the difference of the clock biases of the UE and each eNodeBs in an extended Kalman filter (EKF) framework. The first approach does not provide an on-the-fly navigation solution. The second approach is not feasible with real LTE signals, whose eNodeBs are not perfectly synchronized. In the third approach, certain a priori knowledge about the UE's and/or the eNodeBs' states must be assumed in order to make the estimation problem observable. However, initial knowledge about UE states (e.g., position, velocity, clock bias, and clock drift) might not be available in many practical scenarios, (e.g., cold-start in the absence of GNSS signals).

Techniques for joint angle and delay estimation (JADE) include multiple signal classification (MUSIC) and estimation of signal parameters via rotational invariance techniques (ESPRIT). MUSIC and ESPRIT are based on the eigen-structure of a covariance matrix. These algorithms were obtained based on the assumption of noncoherent received signals. Therefore, in the presence of coherent multipath signals, additional signal processing must be performed. In addition, certain techniques estimate DOA are always in an interval of $[0, \pi]$, which can introduce ambiguity in DOA estimates since signals received at angles $\theta \in [0, \pi]$ and $\theta$ will be measured as $\theta$. One of the challenges of all JADE algorithms is their high computational cost.

There is a desire for positioning processes and configurations that can operate using signals of opportunity when global navigation satellite system signals are unavailable or otherwise undesirable to use.

BRIEF SUMMARY OF THE EMBODIMENTS

Disclosed and described herein are systems, methods and device configurations for determining position. In one embodiment, a method is provided for determining position using signals of opportunity based on joint time of arrival (TOA) and direction of arrival (DOA) acquisition and tracking. The method includes receiving, by a device, at least one signal of opportunity, and performing, by the device, an estimation of time of arrival (TOA) and direction of arrival (DOA) for the at least one signal of opportunity. The estimation of TOA and DOA is jointly determined by the device. The method also includes performing, by the device, signal tracking of TOA and DOA estimates for the at least one signal of opportunity, wherein the TOA and DOA estimates are refined based on an azimuth, elevation and delay locked-loops. The method also includes determining, by the device, a location for the device based on refined TOA and DOA estimates.

In one embodiment, the at least one signal of opportunity is a cellular long-term evolution (LTE) signal.

In one embodiment, the estimation of time of arrival (TOA) and direction of arrival (DOA) is performed using three-dimensional (3D) matrix pencil (MP) operations to jointly estimate two-dimensional (2D) DOA and TOA of a received signal of opportunity.

In one embodiment, the 3D MP operations jointly estimate TOA and DOA by constructing an estimated enhanced matrix, using pencil parameters to improve estimation and provide noise filtering, and wherein the enhanced matrix is decomposed using single value decomposition into signal and noise subspaces, and wherein the TOA is determined from the channel frequency response.

In one embodiment, the estimation of time of arrival (TOA) and direction of arrival (DOA) is performed using a cell-specific reference signal (CRS), and wherein a channel frequency response (CFR) is estimated using the CRS.

In one embodiment, the estimation of time of arrival (TOA) and direction of arrival (DOA) is performed using a uniform planar array having a plurality of antenna elements, and wherein phase difference of a received signal of opportunity is determined at each antenna element of the uniform planar array.

In one embodiment, signal tracking includes an elevation locked-loop tracking loop structure, an azimuth locked-loop tracking loop structure, and a delay locked-loop tracking loop structure, each loop structure configured to refine and track changes in TOA and DOA.

In one embodiment, each tracking loop structure includes a correlator receiving input from a reference signal generator and locked-lop configuration, each correlator generating an down and up correlation functions of a CFR as input to a discriminator operation.

In one embodiment, determining device location includes performing an extended Kalman filter (EFF) operation using determined TOA and DOA estimates.

In one embodiment, the method also includes controlling navigation using the location determined for the device.

Another embodiment is directed to a device configured for determining position using signals of opportunity based on joint time of arrival (TOA) and direction of arrival (DOA) acquisition and tracking. In one embodiment the device includes a communications module configured to receive at least one signal of opportunity, and a controller, coupled to the communications module. The controller is configured to perform an estimation of time of arrival (TOA) and direction of arrival (DOA) for the at least one signal of opportunity. The estimation of TOA and DOA is jointly determined by the device. The controller is also configured to perform signal tracking of TOA and DOA estimates for the at least one signal of opportunity, wherein the TOA and DOA estimates are refined based on an azimuth, elevation and delay locked-loops. The controller is also configured to determine a location for the device based on refined TOA and DOA estimates.

Other aspects, features, and techniques will be apparent to one skilled in the relevant art in view of the following detailed description of the embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to determining position using signals of opportunity, such as cellular long-term evolution (LTE) communications signals. In one embodiment, a process and receiver/architecture are provided for acquisition and tracking of time of arrival (TOA) and direction of arrival (DOA) of received signals. Acquisition and tracking of the signals can be performed to determine a receiver's position. Embodiments provide a navigation solution when positioning sources (e.g., GNSS signals, etc.) become unreliable or unavailable. In addition to positioning, embodiments may be directed to localization and navigation. References to position, positioning and location refer to physical location of a device. Location of a device may be determined with a margin of error (e.g., on the order of a meter). According to embodiments, location may be determined relative to a coordinate system and/or relative to known a base transmitter, wherein the base transmitter location may be known and/or determined.

According to one embodiment, configurations and processes are provided for acquisition of at least one signal of opportunity, such as LTE signals, for determining position. In one embodiment, a 3D matrix pencil (MP) algorithm is provided to jointly estimate 2D DOA and TOA of received LTE signals. A discussion of a first-order perturbation analysis to analyze the performance in the presence of noise is discussed herein.

Another embodiment is directed to tracking of acquired signals. In one embodiment, tracking loop configurations and operations are provided to jointly track TOA and 2D DOA of received LTE signals. A discussion of tracking loop performance in the presence of noise and multipath is provided herein. As also discussed herein, tracking loops may be performed and used to refine coarse estimates of DOA and TOA.

Processes and configurations discussed herein allow for navigation and overcome one or more drawbacks of prior processes. By way of example, to remove a required a priori knowledge about a user equipment (UE) states, processes herein can exploit the temporal diversity of TOA measurements and spatial diversity of direction-of-arrival (DOA) measurements from LTE signals. In one embodiment a matrix pencil (MP) algorithm was used to jointly estimate the TOA and DOA of the received LTE signals, and a navigation framework was proposed to estimate the location of the receiver using these navigation observables in a cold-start fashion. In contrast to MUSIC and ESPRIT algorithms, the matrix pencil (MP) approach can work directly with data and does not need additional signal processing in the presence of coherent multipath signals.

According to one embodiment, a matrix pencil (MP) algorithm is used exclusively during acquisition to provide initial estimates of TOA and DOA. Tracking loops may be employed to refine these estimates and track their changes. TOA tracking loops can include use for a 2D angle estimation of a mobile satellite communications using a UPA. In tracking loops described herein, the estimates of the angles and TOA are first removed from a received signal, which removes bias of a discriminator function and as a result, the need for modification factor is eliminated.

The disclosure discusses derivation of Cramer-Rao lower bounds (CRLBs) of the TOA and DOA estimates to compare the performance of estimation and tracking approaches. The computational complexity of the proposed estimation and tracking approaches are also compared. Experimental results are provided with real LTE signals, which show higher stability of the proposed structure. For example, experimental results with real LTE signals are presented for a 2×2 UPA. The results show that the proposed receiver structure can reduce the standard deviation of the TOA, azimuth, and elevation angles' estimation errors by 93%, 57%, and 31%, respectively, compared to the MP algorithm.

Throughout the paper, the following notations are used:
$\hat{x}$ estimate of x
x vector notation
$x_i$ vector indexed for some purpose
X matrix notation
$X_{i,j}$ (i,j)-th element of matrix X
$X_i$ matrix indexed for some purpose
$\Delta x$ difference between z and x; $\Delta x = \hat{x} - x$
vec $\{X\}$ stacks columns of matrix X one under another
$\tau$ transpose operator
H Hermitian transpose operator
* complex conjugate
⊗ Kronecker product
⊙ Khatri-Rao product
° Hadmard product
$E\{\cdot\}$ Expectation operator
† Moore-Penrose pseudo-inverse
$R\{\cdot\}$ and $\Im\{\cdot\}$ real and imaginary parts, respectively
$I_m$ identify matrix of size m
$0_{m \times n}$ m×n matrix of zeroes
var $\{x\}$ Variance of random variable x
cov (x,y) Covariance of random variables x and y
$x^{(u)}$ Variable allocated to the u-th LTE eNodeB As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "pseudorange" refers to values calculated by a receiver representing the time a signal has taken to travel from a satellite to a receiver. Pseudorange is modeled as the true range between the satellite and receiver plus the speed of light times the difference of the receiver's and satellite's clock biases.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1:
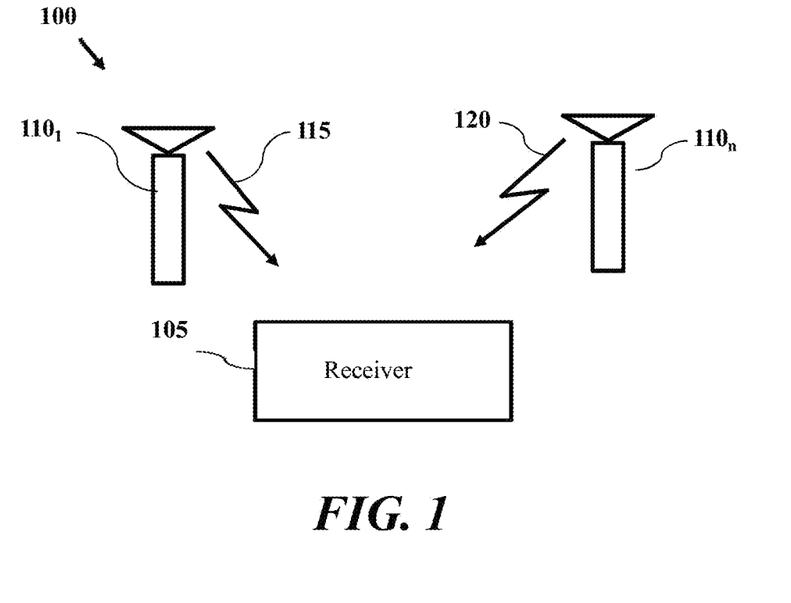
FIG. 1 is a graphical representation of a receiver configured to acquire and track signals of opportunity according to one or more embodiments.

FIG. 1 is a graphical representation of a receiver device configured to acquire and track signals of opportunity according to one or more embodiments. According to one embodiment, receiver 105 may be configured to receive at least one signal of opportunity, such as LTE signals, from a communication network 100. As shown in FIG. 1, communication network 100 includes a plurality of antenna elements $110_{1-n}$ configured to transmit signals 115, 120. Antenna elements $110_{1-n}$ maybe antenna elements of base stations. According to one embodiment, configurations and processes are provided for a receiver, such as receiver 105, to determine its position based on one or more signals of opportunity and when dedicated positioning sources/signals are not available. According to one embodiment, transmitted signals 115, 120 are not positioning signals, but signals of opportunity that receiver 105 may utilize to determine its position based on estimation of time of arrival (TOA) and direction of arrival (DOA) for the signal of opportunity.

Receiver 105 may use one or more processes and device configurations described herein to utilize signals of opportunity, such as at least one of signals 115, 120, transmitted from one or more of antenna elements $110_{1-n}$. Signals 115, 120 may relate to signals of opportunity and thus, are not transmitted for the purpose by antenna elements $115_{1-n}$ for the purpose of positioning. By way of example, receiver 100 may be configured to perform process 200 described below with reference to FIG. 2. As described herein, processes are provided to acquire one or more signal parameters from a transmitted signal, such as an OFDM symbol, cell-specific reference signal (CRS) and/or channel frequency response. According to embodiments, receiver 105 can determine its position relative to one or more of antenna elements $110_{1-n}$, wherein the position of receiver 105 may include location coordinates, and/or mapping coordinates. Receiver may also be configured to perform one or more of localization and navigation using position determinations determined using at least one of signals 115, 120.

Receiver 105 may relate to one or more of a fixed position device and a mobile device, and may be included in other devices such as a communications device, vehicle, etc. Receiver 105 may include components for acquisition and tracking of signals of opportunity. By way of example receiver 105 may include components of device 300 of FIG. 3 and/or components of FIGS. 13A-13B. Receiver 105 may be configured to include components configured to perform the tracking loop operations of FIG. 5.

Figure 2:
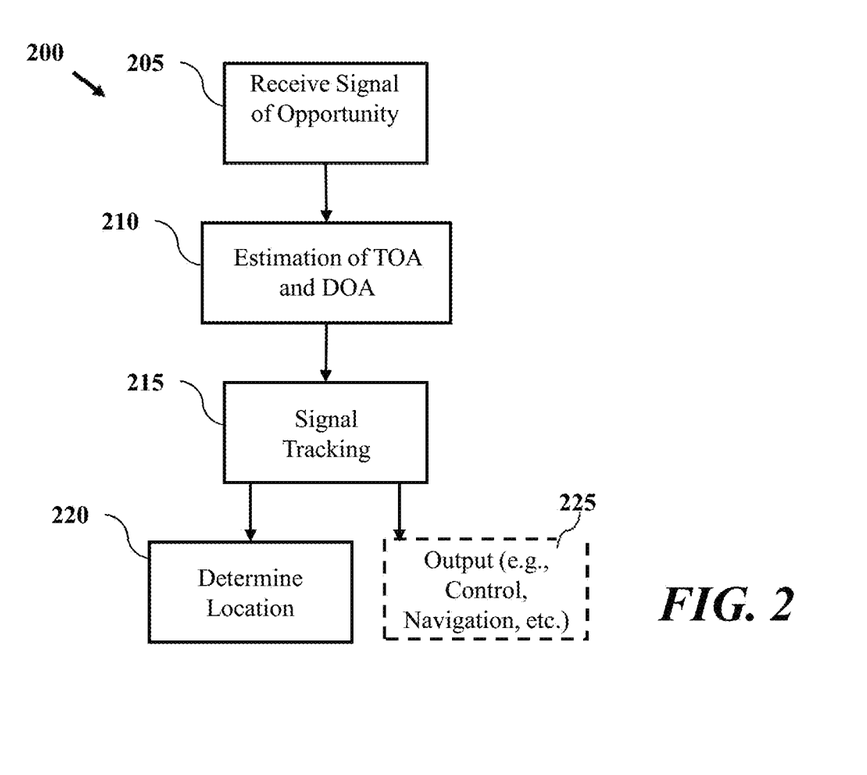
FIG. 2 illustrates a process for positioning according to one or more embodiments.

FIG. 2 illustrates a process for acquisition and tracking according to one or more embodiments. Process 200 may be employed by a device, such as receiver 105, to determine a position estimate and/or location of a device. Process 200 may be initiated by a receiver (e.g., receiver 105) detecting one or more signals of opportunity, such as transmissions of LTE signals, at block 205. The receiver may be configured to acquire and track signals from one or more antenna sources transmitting cellular long-term evolution (LTE) signals. Although LTE signals are discussed herein, it should be appreciated that the processes described herein may be applied to other signals of opportunity. Acquisition and tracking of a signal of opportunity may be performed using at least one signal model. As discussed below, acquisition of an orthogonal frequency division (OFDM) signal used to transmit data may include obtaining one or more signal parameters of the transmitted signal in order to determine a position of the device relative to the transmission source (e.g., antenna elements $110_{1-n}$).

At block 205, one or more signals of opportunity may be detected. Process 200 may include selection of at least one signal of opportunity for acquisition at block 205. Similarly, process 200 may include selection of signals of opportunity based on a particular downlink transmission type, such as a cellular long-term evolution (LTE) signal. According to embodiments, process 200 may include performing position estimates on each received signal of opportunity. According to embodiments, the signal of opportunity may be a downlink transmission including one or more symbols, such as an OFDM symbol.

At block 210, process 200 includes performing, an estimation of time of arrival (TOA) and direction of arrival (DOA) for received signals of opportunity. According to embodiments, coarse estimations of a DOA and TOA at block 210 are performed using a signal model as discussed herein. In one embodiment, a coarse estimation of time of arrival (TOA) and direction of arrival (DOA) is performed using a three-dimensional (3D) matrix pencil (MP) operations. According to embodiments, 3D MP operations may be based on device configurations to perform one or more executable operations to perform a 3D MP algorithm. Matrix pencil operations can jointly estimate TOA and DOA. The joint estimate at block 210 may be a two-dimensional (2D) DOA and TOA of a received LTE signal. By way of example, the coarse estimate of DOA includes determinations for azimuth and elevation angles of a device relative to a transmitter and coarse estimate of TOA includes determinations of the transmission time, or delay, of a transmitted signal from a transmitter to the device. One more components and operations of a device described herein are performed to obtain the estimations, and refine the estimations to determine location. As described herein, the DOA provides a direction characterizing the signal of opportunity relative to a transmitter (e.g., transmitter $110_1$) and a receiver (e.g., receiver 105). The TOA provides a time value for the signal of opportunity relative to the transmitter and receiver. A 2D representation is provided for DOA and TOA with an assumption that the signal of opportunity travels more or less within a plane between the transmitter and receiver. Embodiments may include use of an altimeter or other sensor to provide receiver altitude/height relative to a transmitter. Estimation of TOA and DOA may be tracked to refine the coarse estimate. Refining a coarse estimate may include updating a determined position estimate for a device. By jointly determining TOA and DOA, position determinations may be updated as a device moves. As described herein, 3D MP operations can jointly estimate TOA and DOA by constructing an estimated enhanced matrix, using pencil parameters to improve estimation and provide noise filtering. The enhanced matrix is decomposed using single value decomposition into signal and noise subspaces, and wherein the TOA is determined from the channel frequency response. According to embodiments, the estimation of time of arrival (TOA) and direction of arrival (DOA) is performed using a cell-specific reference signal (CRS), and wherein a channel frequency response (CFR) is estimated using the CRS.

According to embodiments, the estimation of time of arrival (TOA) and direction of arrival (DOA) at block 210 is performed using a uniform planar array having a plurality of antenna elements. The phase difference of a received signal of opportunity is determined at each antenna element of the uniform planar array. The 3D matrix pencil may use output voltage of antennas of the uniform planar array as input.

At block 215, process 200 includes performing signal tracking of TOA and DOA estimates for at least one signal of opportunity. The TOA and DOA estimates may be refined based on an azimuth, elevation and delay locked-loops. By way of example, signal tracking may be based on an elevation locked-loop tracking loop structure, an azimuth locked-loop tracking loop structure, and a delay locked-loop tracking loop structure. Each loop structure configured to refine and track changes in TOA and DOA. Characterizations of the phase locked-loops as structures may relate to operational modules of a processor or controller. According to embodiments, each tracking loop structure includes a correlator receiving input from a reference signal generator and locked-lop configuration, each correlator generating an down and up correlation functions of a CFR as input to a discriminator operation. In certain embodiments, the phase locked loops may relate to software defined radio operations performed by a controller and/or processor.

At block 220, process 200 includes determining location for the device based on refined TOA and DOA estimates. According to embodiments, determining device location includes performing an extended Kalman filter (EFF) operation (e.g., recursive filter operation) using determined TOA and DOA estimates. The determined location may be an estimate. In certain embodiments, the parameters provided by the tracking loops provide a distance, elevation angle and azimuth angle from an LTE antenna. Process 200 may include controlling navigation using the location determined for the device. In certain embodiments, navigation may be based on and/or assisted by position determinations of process 200. At block 225, process 200 may optionally output one or more of determinations of position data and/or control outputs for navigation based on determined position.

Figure 3:
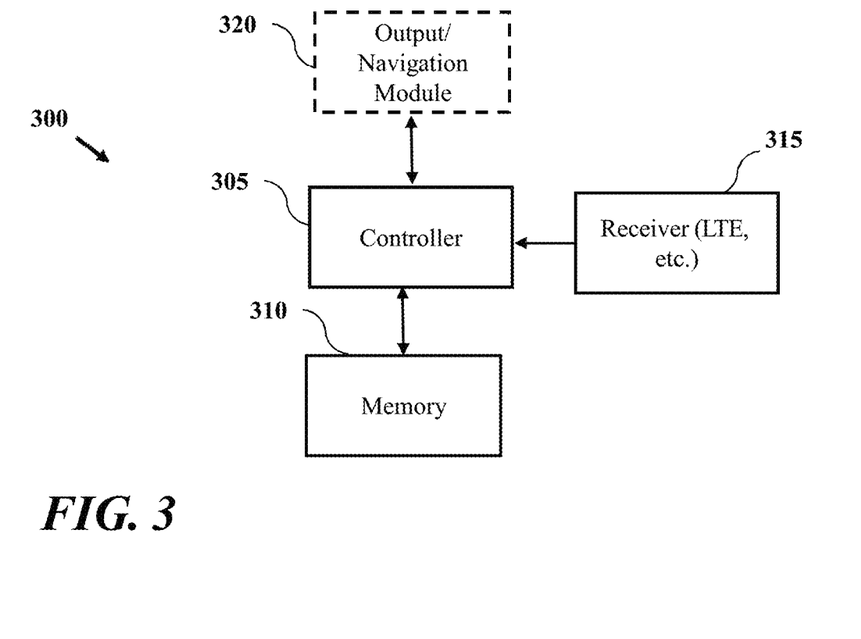
FIG. 3 depicts a device configuration according to one or more embodiments.

FIG. 3 depicts a device configuration according to one or more embodiments. Device 300 may relate to a receiver or components of a vehicle configured to signals of opportunity such as LTE signals. According to one embodiment, device 300 includes controller 305, memory 310 and receiver 315. Device 300 may optionally include an output/navigation module 320.

Controller 305 may relate to a processor or control device configured to execute one or more operations stored in memory 310, such as joint acquisition and tracking of LTE signals. Controller 305 may be coupled to memory 310 and receiver 315. According to embodiments, controller 305 may be configured to control, execute, and/or direct operations of a process for determining location and navigation observables, such as process 200 of FIG. 2. Receiver 315 may be a communications module configured to receive one or more signals of opportunity. In certain embodiments, receiver 315 may be configured to include one or more software defined radio elements to acquire and track transmitted signals. According to one embodiment, controller 305 may be configured to determine a position of device 300 based on tracking loop functions of TOA and DOA estimates. Position determinations may be used to output navigation commands or operate a device by way of optional output/navigation module 320. Optional output/navigation module 320 may be configured to determine and output navigation observables using refined TOA and DOA estimates.

I. Signal Model

As discussed herein, embodiments include determining TOA and DOA parameters for determining position based on signals of opportunity, such as LTE signals. LTE signals may be transmitted y fixed base stations and received by a receiver or a device. Received LTE signals may include one or more characteristics which are not intended for positioning, but never the less can be utilized according to embodiments described herein. A discussion of a signal model is provided which may be used by embodiments.

Transmitted Signal Model

In LTE downlink transmission, orthogonal frequency division multiple access (OFDM) signals may be used to transmit communications data. With the LTE downlink transmissions are included an OFDM symbol. An OFDM symbol may be obtained by parallelizing serial data symbols of a downlink signal into groups of length $N_r$, zero-padding to length $N_c$, and taking an inverse fast Fourier transform (IFFT). Each symbol has a duration of $T_{symb}=1/f_s$, where $f_s=15$ KHz is the subcarrier spacing. An LTE frame has a duration of 10 ms and is composed of 20 slots, each of which contains seven OFDM symbols.

To establish a connection between a receiver device (e.g., user equipment (UE)) and a transmitter (e.g., LTE base station eNodeB), several reference signals are broadcast from the transmitter base station. Since these signals are broadcast, it is possible to exploit them for navigation purposes without the need to be a subscriber of the network. In this disclosure and according to embodiments, a cell-specific reference signal (CRS) is used to extract TOA and DOA from LTE signals. The CRS is an orthogonal sequence within a downlink transmission that is defined based on the cell identification (ID) $N_{ID}^{Cell}$, the allocated symbol number, the slot number, and the transmission antenna port number. The CRS is scattered in time and bandwidth and is used to estimate the channel frequency response (CFR). The subcarriers designated to the CRS are $$\{q\hat{N}_{CRS} + v_{N_{ID}^{Cell}}\}_{l=0}^{N_o-1}$$

where $N_s = \lfloor N_r/N_{CRS} \rfloor$, $N_{CRS}=6$ and $v_{N_{ID}^{Cell}}$ is a constant shift, which is a function of the symbol number, transmission antenna port number, and the cell ID.

Received Signal Model

Figure 4:
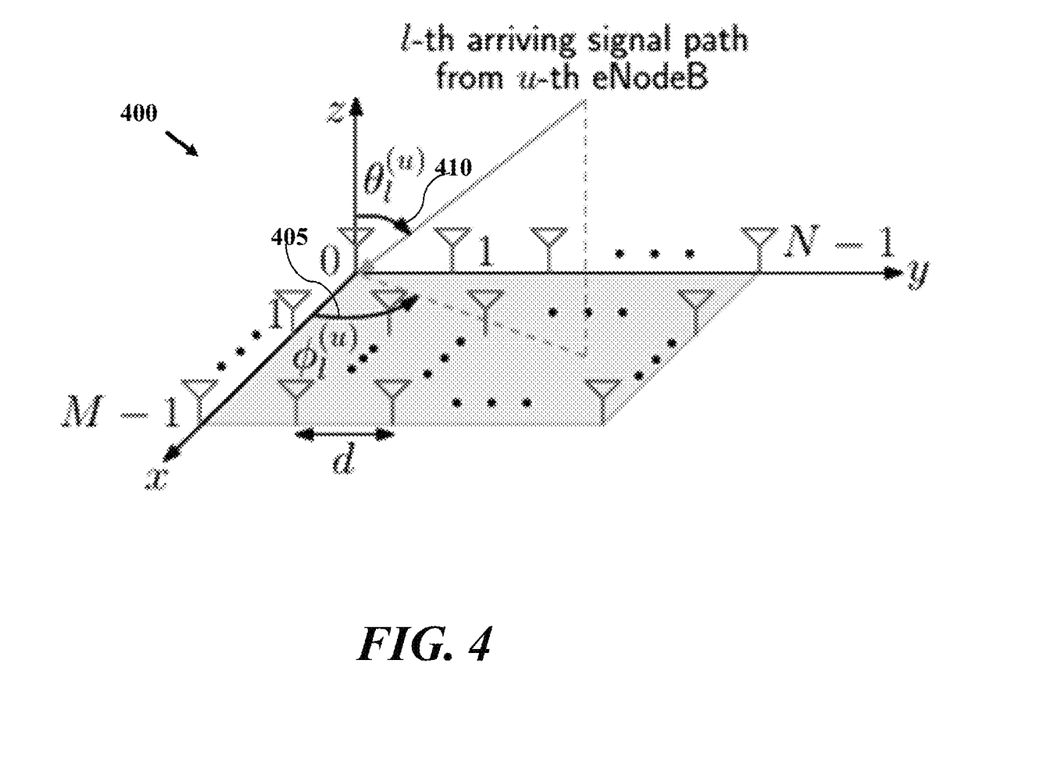
FIG. 4 illustrates a graphical representation of direction of arrival according to one or more embodiments.

FIG. 4 illustrates a graphical representation of direction of arrival according to one or more embodiments. At the receiver, a uniform planar array (UPA) can be used to estimate TOA and DOA (having azimuth and elevation angles) using the phase difference of the received signal at different antenna elements and different subcarriers. FIG. 4 shows a UPA 400 with M antenna elements in the x-direction and N antenna elements in the y-direction. To provide directivity to the antenna array, the spacing between antenna elements should not be very small. However, large spacing causes multiple radiation lobes, which are not desirable. Therefore, the distance between adjacent antenna elements is typically assigned to be $d=\lambda/2$, where $\lambda=c/f_c$ is the received signal wavelength, c is the speed-of-light, and $f_c$ is the carrier frequency.

The transmitted signal (e.g., transmitted signals 115, 120) from the u-th eNodeB propagates to the antenna array through $L^{(u)}$ different paths, where the l-th arriving path has an attenuation and delay of $\alpha_l^{(u)}$ and $\tau_l^{(u)}$ respectively, and impinges the antenna array at an azimuth angle $\varphi_l^{(u)}$ 405 and an elevation angle $\theta_l^{(u)}$ 410 as shown in FIG. 4.

Denoting $\hat{H}^{(u)} \in \mathbb{C}^{M \times N \times N_s}$ and $H^{(u)} \in \mathbb{C}^{M \times N \times N_s}$ to be the estimated and true CFRs of the u-th eNodeB, it can be shown that $\hat{H}^{(u)} \in H^{(u)}+W$, where $W_{m,n,q} \sim CN(0, \sigma^2)$ is the contribution of than additive white Guassian noise (AWGN) channel at the (m,n)-th antenna element and the q-th CRS sub carrier, and $$H_{m,n,q}^{(u)} = \sum_{l=1}^{L^{(u)}-1} \sqrt{C}\, \beta_l^{(u)}\, x_l^{(u)^m}\, y_l^{(u)^n}\, z_l^{(u)^q},$$

$$\beta_l^{(u)} \triangleq \alpha_l^{(u)}\, e^{-j2\pi v N_{ID}^{C_s B} f_s \tau_l^{(u)}}\, e^{-j\omega_c \tau_l^{(u)}}$$

$$x_l^{(u)} \triangleq e^{j\frac{\omega_c d}{c} \sin\theta_l^{(u)} \cos\phi_l^{(u)}},$$

$$y_l^{(u)} \triangleq e^{j\frac{\omega_c d}{c} \sin\theta_l^{(u)} \sin\phi_l^{(u)}},$$

$$z_l^{(u)} \triangleq e^{-j2\pi f_s N_{CBS} \tau_l^{(u)}},$$

where C is the carrier power, $\omega_c=2\pi f_c$ and it is assumed that $\alpha_0^{(u)}=1$. The objective is to estimate $(x_l^{(u)}, y_l^{(u)}, z_l^{(u)})$ and to obtain the relative TOA and DOA of each path as $$\hat{\theta}_l^{(u)} = \sin^{-1}(\sqrt{\kappa^2 + \varsigma^2}).$$

$$\hat{\phi}_l^{(u)} = a\tan2(\varsigma, \kappa).$$

$$\hat{\tau}_l^{(u)} = -\frac{1}{2\pi f_s N_{CRS}} a\tan2(\Im\{\hat{z}_l^{(u)}\}, \Re\{\hat{z}_l^{(u)}\}),$$

where a tan 2 is the four-quadrant inverse tangent function and $$\kappa \triangleq \frac{c}{\omega_c d} a\tan2(\Im\{\hat{x}_l^{(u)}\}, \Re\{\hat{x}_l^{(u)}\}),$$

$$\varsigma \triangleq \frac{c}{\omega_c d} a\tan2(\Im\{\hat{y}_l^{(u)}\}, \Re\{\hat{y}_l^{(u)}\}).$$

According to one embodiment, the TOA and DOA estimation is performed in two stages: acquisition and tracking. In the description below, for simplicity of notations, the superscript (u), which denotes the u-th eNodeB, will be dropped in the sequel, unless it is required.

II. Signal Acquisition

According to embodiments, processes and device configurations include operations for acquisition of a signal of opportunity. In the acquisition stage, the 3D MP algorithm is used to jointly estimate the TOAs and DOAs of received LTE signals. This section discusses the process of estimating the TOA and DOA and characterizes the estimation performance in the presence of noise.

A. TOA and DOA Estimation

A 3D MP algorithm can be divided into three one-dimensional (1D) MP algorithms to estimate $x_1$, $y_1$, and $z_1$ individually. According to one embodiment, there are five main steps in a 3D MP algorithm, which are discussed next.

Step 1: Construct the estimated enhanced-matrix as $$\hat{E} \triangleq \begin{bmatrix} \hat{E}_0 & \hat{E}_1 & \cdots & \hat{E}_{N_x-R} \\ \hat{E}_1 & \hat{E}_2 & \cdots & \hat{E}_{N_x-R+1} \\ \vdots & \vdots & \ddots & \vdots \\ \hat{E}_{R-1} & \hat{E}_R & \cdots & \hat{E}_{N_x-1} \end{bmatrix}_{PKR \times [(M-P+1)(N-K+1)(N_x-R+1)]},$$

$$\hat{E}_k \triangleq \begin{bmatrix} \hat{E}_{0,k} & \hat{E}_{1,k} & \cdots & \hat{E}_{N-K,k} \\ \hat{E}_{1,k} & \hat{E}_{2,k} & \cdots & \hat{E}_{N-K+1,k} \\ \vdots & \vdots & \ddots & \vdots \\ \hat{E}_{K-1,k} & \hat{E}_{K,k} & \cdots & \hat{E}_{N-1,k} \end{bmatrix},$$

$$\hat{E}_{j,k} \triangleq \begin{bmatrix} \hat{H}_{0,j,k} & \hat{H}_{1,j,k} & \cdots & \hat{H}_{M-P,j,k} \\ \hat{H}_{1,j,k} & \hat{H}_{2,j,k} & \cdots & \hat{H}_{M-P+1,j,k} \\ \vdots & \vdots & \ddots & \vdots \\ \hat{H}_{P-1,j,k} & \hat{H}_{P,j,k} & \cdots & \hat{H}_{M-1,j,k} \end{bmatrix},$$

for $j = 0, 1, \ldots N-1$, and $k = 0, 1, \ldots, N_s - 1$,

Where P, K and R are pencil parameters. The pencil parameters are tuning parameters that are used to improve the estimation accuracy and must satisfy the following necessary conditions $(P-W)RK \geq L, (K-1)PK \geq L, (R-1)PK \geq L$.

$(M-P+1)(N-K+0.1)(N_s-R+1) \geq L$.

For efficient noise filtering, pencil parameters should be selected between one third and two third of their corresponding parameters.

Step 2: Decompose the enhanced matrix $\check{E}$ using singular-value decomposition (SVD) as $\hat{E} = \hat{U}\hat{\Sigma}\hat{V}^H$, where $\hat{U}$ and $\hat{V}$ are unitary matrices of singular vectors, and $\hat{\Sigma}$ is the matrix of singular values $\sigma_1 \geq \ldots \geq \sigma_{KPR}$. Next, the minimum description length (MDL) criterion is used to estimate multipath channel length.

Step 3: Knowing the length of the channel impulse response, the enhanced matrix $\check{E}$ can be decomposed into the signal and noise subspaces as $\hat{E} = \hat{U}_s\hat{\Sigma}_s\hat{V}_n^H + \hat{U}_n\hat{\Sigma}_s\hat{V}_n^H$, where $U_s$ and $V_s$ are composed of singular vectors corresponding to the L largest singular values of $\check{E}$ and span the signal subspace of $\check{E}$; and $U_n$ and $V_n$ span the noise subspace of $\check{E}$. Removing the last and first PK rows of $U_s$ is performed to build matrices of $U_{s1}$ and $U_{s2}$, respectively as:

$\hat{U}_{s1} = C_1 U_s, C_1 = [I_{PK(R-1)}, 0_{PK(R-1)\times PK}]$, $\hat{U}_{s2} = C_2 U_s, C_2 = [0_{PK(R-1)\times PK}, I_{PK(R-1)}]$.

Step 4: Derive the generalized eigenvalues of the pencil pair $(U_{s1}, U_{s2})$ which are equal to the eigenvalues of $\hat{\Psi}_z = \hat{U}_{s_1}^\dagger \hat{U}_{s_2}$. The resulting eigenvalues are permutation of $\{\hat{z}_0, \ldots, \hat{z}_{L-1}\}$.

Step 4: Form the matrix $\hat{U}_j = J\hat{U}_s$ where J is the permutation matrix given by $J_i \triangleq [J_0, J_1, \ldots, J_{K-1}]^T$ here $J_i$ is defined as $J_i \triangleq [(1+iP), \ldots, p(P+iP), p(1+iP+PK), \ldots, p(P+iP+PK), \ldots, p(1+iP+(R-1)PK), \ldots, p(P+iP+(R-1)PK)]$ where p(l) is a column vector of the size KPR with one in the (l)-th element and zero elsewhere. Similar to above, building Uj1 and Uj2 from Uj by removing the last first PR rows, respectively. The eigenvalues of $\hat{\Psi}_y = \hat{U}_{j1}^\dagger \hat{U}_{j2}$ are permutation of $\{\hat{y}_0, \ldots, \hat{y}_{L-1}\}$.

Step 5: Construct matrix $\hat{U}_p = P\hat{U}_s$ where P is the permutation matrix defined as $P \triangleq [p(1), p(1+P), \ldots, p(1+(KR-1)P), p(2), p(2+P), \ldots, p(2+(KR-1)P), \ldots, p(P), p(P+P), \ldots, p(P+(KR-1)P)]^T$.

The estimate TOA and DOA can be removed from the estimated channel frequency response given by $H'_{m,n,q} \triangleq \hat{H}_{m,n,q} \hat{x}_0^{-m} \hat{y}_0^{-n} \hat{z}_0^{-q}$ As such estimates of TOA and DOA can be obtained from signal parameters extracted from a signal opportunity, such as a downlink transmission of a LTE base station.

Noise Performance Analysis

In the presence of noise, the estimated DOA and TOA are slightly different than actual values. The statistics of the description is described below. Using first order perturbations theory, eigenvalues can be denoted and simplified to determine variance of the estimation error. The variance of the estimation of $\theta$ and $\varphi$ can be obtained as:

$$\text{var}\{\Delta\theta_i\} = \frac{c^2}{2\omega_c^2 d^2 \cos^2\theta_i}$$
$[\cos^2\phi_i \text{var}\{\Delta x_i\} + \sin^2\phi_i \text{var}\{\Delta y_i\} + 2\sin\phi_i\cos\phi_i \Re\{\text{cov}\{\Delta x_i, \Delta y_i\}\}]$, $$\text{var}\{\Delta\theta_i\} = \frac{c^2}{2\omega_c^2 d^2 \sin^2\theta_i}$$
$[\sin^2\phi_i \text{var}\{\Delta x_i\} + \cos^2\phi_i \text{var}\{\Delta y_i\} - 2\sin\phi_i\cos\phi_i \Re\{\text{cov}\{\Delta x_i, \Delta y_i\}\}]$.

Signal Tracking

According to one embodiment, a tracking stage is provided by a receiver configured to refine TOA and DOA estimates and to track changes in the estimates.

Figure 5:
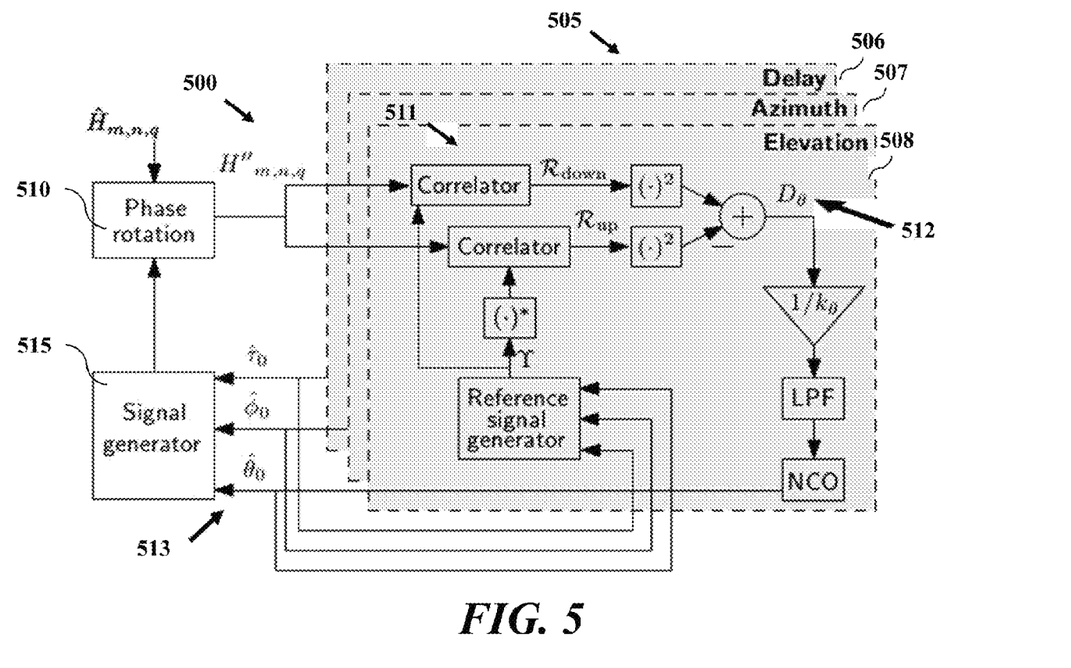
FIG. 5 illustrates tracking loop configuration according to one or more embodiments.

FIG. 5 illustrates tracking loop configuration according to one or more embodiments. According to one embodiment, a tracking stage has three main components, an elevation locked-loop (ELL), an azimuth locked-loop (ALL) and a delay locked-loop (DLL). Tracking loop structure 500 includes DLL tracking structure 506, ALL tracking structure 507, and ELL tracking structure 508. Estimated CFR is received at phase rotation input 510 as well as reference signal from signal generator 515. In FIG. 5, ELL tracking structure 508 is shown receiving input from phase rotation input 510 and signal generator 515 to correlators, shown as 511. ELL tracking structure 508 includes correlators 511 receiving input from a reference signal generator and locked-loop configuration. Cross correlator output of the correlators 511 are provided to discriminator 512. ALL tracking loop 507 and DLL tracking loop 506 may be configured to have a similar structure and elements as ELL tracking loop 508. ALL tracking loop 507 and DLL tracking loop 506 may also receive input from phase rotation input 510 and signal generator 515. In certain embodiments, each tracking loop may have modifications respective to discriminators, scaling and reference signal generators. ELL tracking structure 508, ALL tracking loop 507, and DLL tracking loop 506 may output refined estimates 513 including elevation, azimuth and delay.

The ELL discriminator function of ELL tracking structure 508 may provide an elevation angle discriminator function defined as:

$$D_0 \triangleq \begin{cases} \sum_{q=0}^{N_s-1} \sum_{n=0}^{N-1} [|\mathcal{R}_{down}|^2 - |\mathcal{R}_{up}|^2], \\ \quad \text{if } |\sin\phi_0| < \eta_{thr}, \\ \sum_{q=0}^{N_s-1} \sum_{m=0}^{M-1} [|\mathcal{R}_{down}|^2 - |\mathcal{R}_{up}|^2], \\ \quad \text{otherwise,} \end{cases}$$

where two different conditions are used to keep the tracking error bounded $$\eta_{thr} = \frac{\sqrt{2}}{2};$$

$R_{down}$ and $R_{up}$ are the down and up cross-correlation functions of $H''_{m,n,q}$ with the up-down locally generated signal T and its conjugate, respectively, which are defined according to $$\mathcal{R}_{down} \triangleq \begin{cases} \sum_{m=0}^{M-1} H'' m, n, q \Upsilon_m, & \text{if } |\sin\phi_0| < \eta_{thr}, \\ \sum_{n=0}^{N-1} H'' m, n, q \Upsilon_n, & \text{otherwise,} \end{cases}$$

$$\mathcal{R}_{up} \triangleq \begin{cases} \sum_{m=0}^{M-1} H'' m, n, q \Upsilon_m^*, & \text{if } |\sin\phi_0| < \eta_{thr}, \\ \sum_{n=0}^{N-1} H'' m, n, q \Upsilon_n^*, & \text{otherwise,} \end{cases}$$

$$\Upsilon_m \triangleq \begin{cases} e^{j\frac{\omega_c d}{c}(m\cos\hat\theta_0 \cos\hat\phi_0 \xi_\theta)}, & \text{if } |\sin\phi_0| < \eta_{thr}, \\ e^{j\frac{\omega_c d}{c}(m\cos\hat\theta_0 \cos\hat\phi_0 \xi_\theta)}, \end{cases}$$

It can be shown that the ELL estimation error has the following closed loop variance:

$$\text{var}\{n_\theta\} = \begin{cases} 2N_s NM^2 \sigma^4 \left(1 + \frac{2C}{M\sigma^2 \sin^2\left(\frac{x}{2M}\right)}\right), \\ \quad \text{if } |\sin\phi_0| < \eta_{thr} \text{ and } \xi_\theta = \frac{x}{2MA_\theta}, \\ 2N_s NM^2 \sigma^4 \left(1 + \frac{2C}{N\sigma^2 \sin^2\left(\frac{x}{2N}\right)}\right), \\ \quad \text{if } |\sin\phi_0| < \eta_{thr} \text{ and } \xi_\theta = \frac{x}{2NB_\theta}. \end{cases}$$

Figure 6:
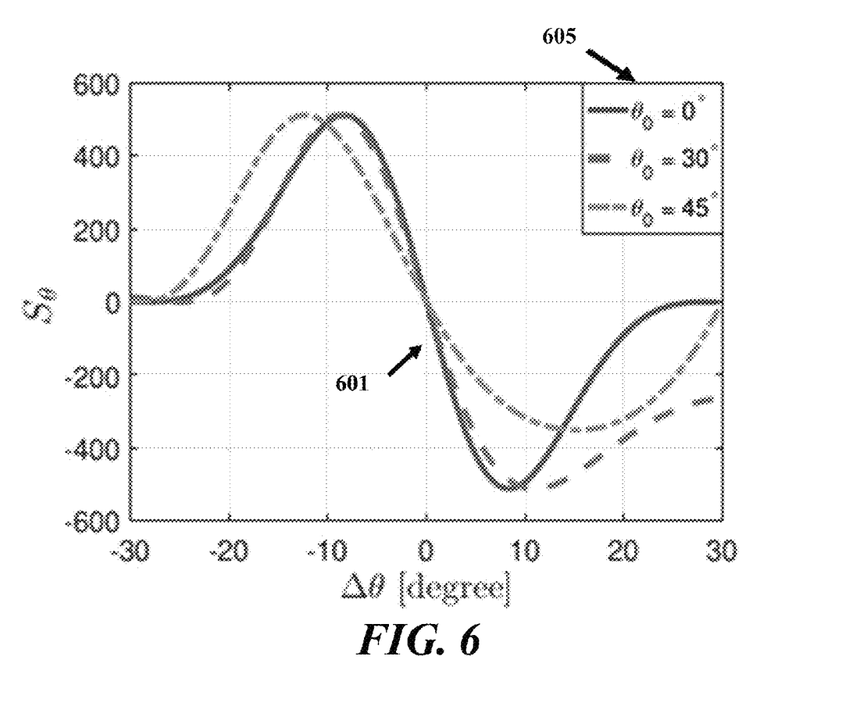
FIG. 6 illustrates an elevation lock loop (ELL) representation according to one or more embodiments.

FIG. 6 illustrates an elevation lock loop (ELL) representation according to one or more embodiments. FIG. 6 illustrates an ELL S curves 601 for different values of elevation angle θ, shown as 605.

It also can be shown that multipath introduces an error on the estimated angle according to:

$$I_\theta = \sum_{q=0}^{N_0-1} [2\Re\{S_{down}^* \cdot I_{down_q}\} + |I_{down_q}|^2] - [2\Re\{S_{up}^* \cdot I_{up_q}\} + |I_{up_q}|^2].$$

Figure 7:
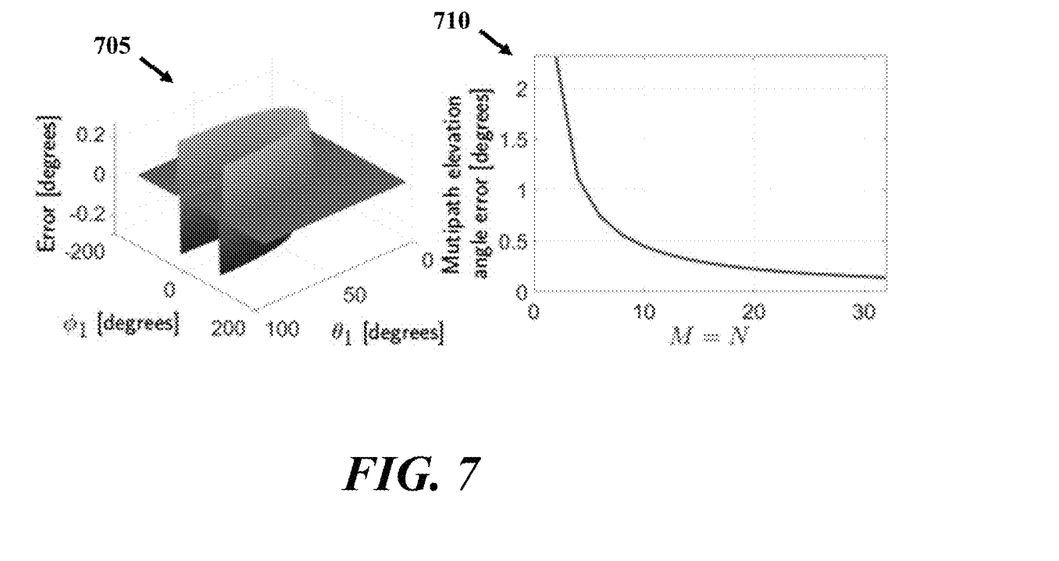
FIG. 7 illustrates elevation angle estimation error representations according to one or more embodiments.

FIG. 7 illustrates the effect of multipath signal on the elevation angle estimation for an environment. Elevation angle estimation error for different azimuth and elevation angles of multipath are shown as 705. Amplitude of maximum elevation angle estimation error for a different number of antenna elements is shown as 710. The elevation angle estimation error due to multipath may depend on the relative azimuth and elevation angles of multipath with respect to the LOS signal. Similarly, the elevation angle estimation error due to multipath may depend on the LOS azimuth and elevation angles. Increasing the number of antennas of a receiver can reduce the elevation angle estimation error caused by multipath.

The ALL Discriminator function may be described as $$D_\phi \triangleq \begin{cases} \sum_{q=0}^{N_s-1} \sum_{m=0}^{M-1} [|\mathcal{R}_{left}|^2 - |\mathcal{R}_{right}|^2], \\ \quad \text{if } |\sin\phi_0| < \eta_{thr}, \\ \sum_{q=0}^{N_s-1} \sum_{n=0}^{N-1} [|\mathcal{R}_{left}|^2 - |\mathcal{R}_{right}|^2], \\ \quad \text{otherwise.} \end{cases}$$

where $$\mathcal{R}_{left} \triangleq \begin{cases} \left|\sum_{n=0}^{N-1} H'' m, n, q \Upsilon_n\right|, & \text{if } |\sin\phi_0| < \eta_{thr}, \\ \left|\sum_{m=0}^{M-1} H'' m, n, q \Upsilon_m\right|, & \text{otherwise,} \end{cases}$$

$$\mathcal{R}_{right} \triangleq \begin{cases} \sum_{n=0}^{N-1} H'' m, n, q \Upsilon_n^*, & \text{if } |\sin\phi_0| < \eta_{thr}, \\ \sum_{m=0}^{M-1} H'' m, n, q \Upsilon_m^*, & \text{otherwise,} \end{cases}$$

It can be shown that the ALL estimation error has the following closed loop variance:

$$\text{var}\{n_\phi\} = \begin{cases} 2N_s NM^2 \sigma^4 \left(1 + \frac{2C}{N\sigma^2 \sin^2\left(\frac{x}{2N}\right)}\right), \\ \quad \text{if } \xi_\phi = \frac{\pi}{2NB_\theta} \text{ and } |\sin\phi_0| < \eta_{thr}, \\ 2N_s NM^2 \sigma^4 \left(1 + \frac{2C}{M\sigma^2 \sin^2\left(\frac{x}{2M}\right)}\right), \\ \quad \text{if } \xi_\phi = \frac{\pi}{2MA_\theta} \text{ and } |\sin\phi_0| < \eta_{thr}. \end{cases}$$

Figure 8:
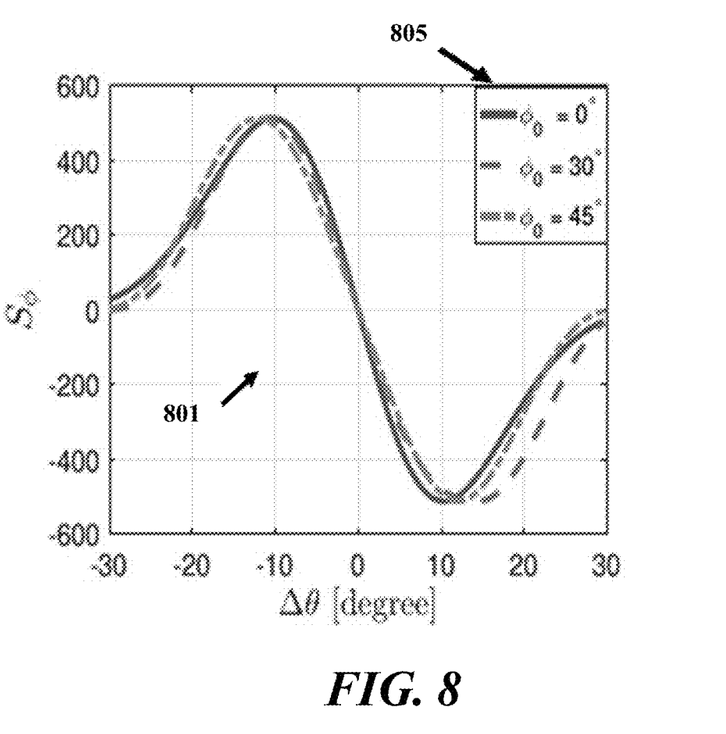
FIG. 8 illustrates an azimuth lock loop (ALL) representation according to one or more embodiments.

FIG. 8 illustrates an azimuth lock loop (ALL) representation according to one or more embodiments. FIG. 8 illustrates an ALL S curve 801 for different values of azimuth angle φ, shown as 805.

The bias caused by multipath on the ALL is as follows:

$$I_\phi = \sum_{q=0}^{N_s-1} [2\Re\{S_{left}^* \cdot I_{left}\} + |I_{left}|^2] - [2\Re\{S_{right}^* \cdot I_{right}\} + |I_{right}|^2]$$

Figure 9:
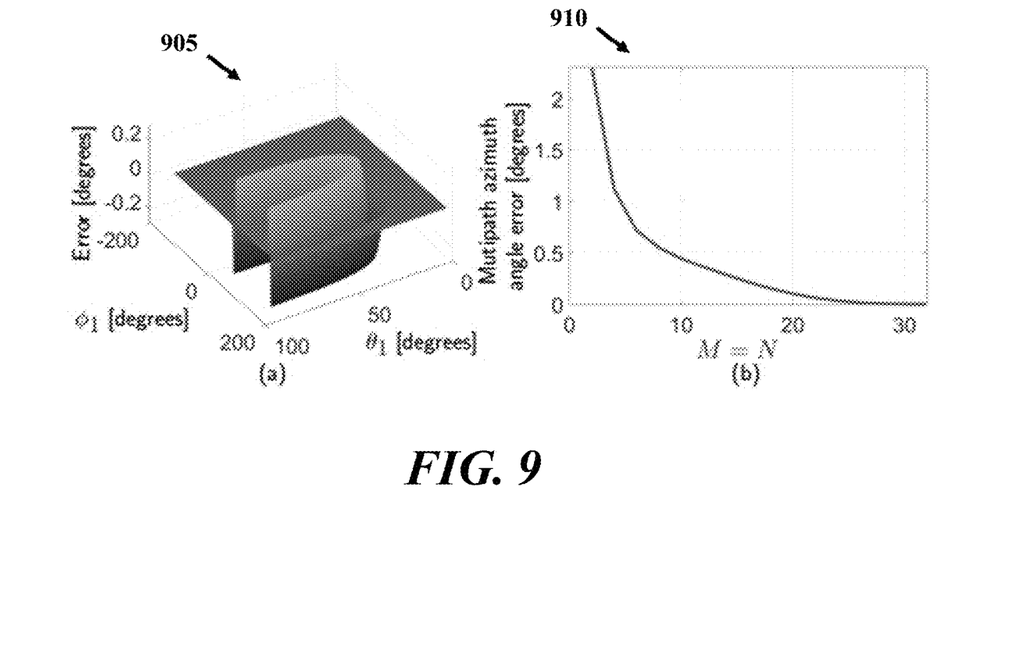
FIG. 9 illustrates azimuth estimation error representations according to one or more embodiments.

FIG. 9 illustrates azimuth estimation error representations according to one or more embodiments. Azimuth angle estimation error for different azimuth and elevation angles of multipath are shown as 905. Amplitude of maximum azimuth angle estimation error for a different number of antenna elements is shown as 910.

For different multipath azimuth and elevation angles, the error depends on the relative azimuth and elevation angles of the multipath signal with respect to the LOS signal. The amplitude of the maximum azimuth angle estimation error for the same multipath settings, but for different number of antenna elements are shown in FIG. 9.

The DLL Discriminator function may be described as $$D_\tau \triangleq \sum_{m=0}^{M-1} \sum_{n=0}^{N-1} [|\mathcal{R}_{late}|^2 - |\mathcal{R}_{early}|^2].$$

The variance of the estimated TOA may be described as $$\text{var}\{n_\tau\} \leq 2MNN_s^2\sigma^4 \left[1 + \frac{2C\sin(\pi f_s N_{CRS} N_s \xi_r)}{N_s \sigma^2 \sin^2(\pi f_s N_{CRS} \xi_r)}\right].$$

Figure 10:
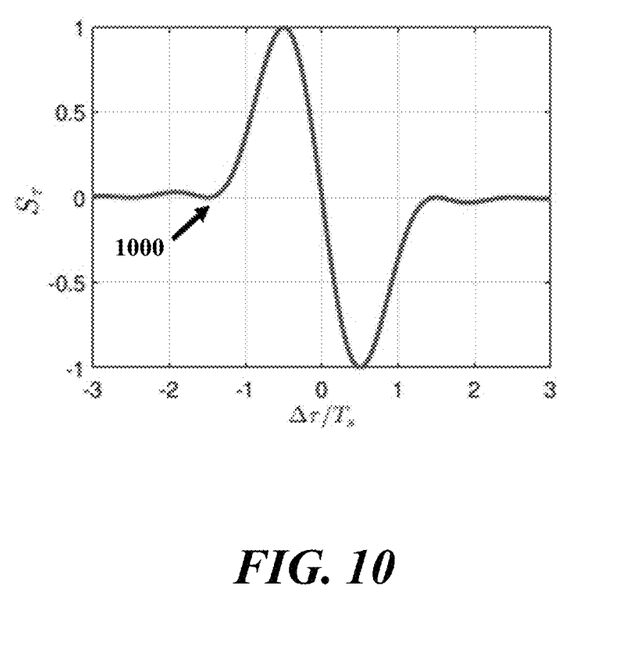
FIG. 10 illustrates a delay lock loop (DLL) representation according to one or more embodiments.

FIG. 10 illustrates a delay lock loop (DLL) representation according to one or more embodiments. For the DLL, the s-curve ST 1000 does not depend on $\tau_0$.

Figure 11:
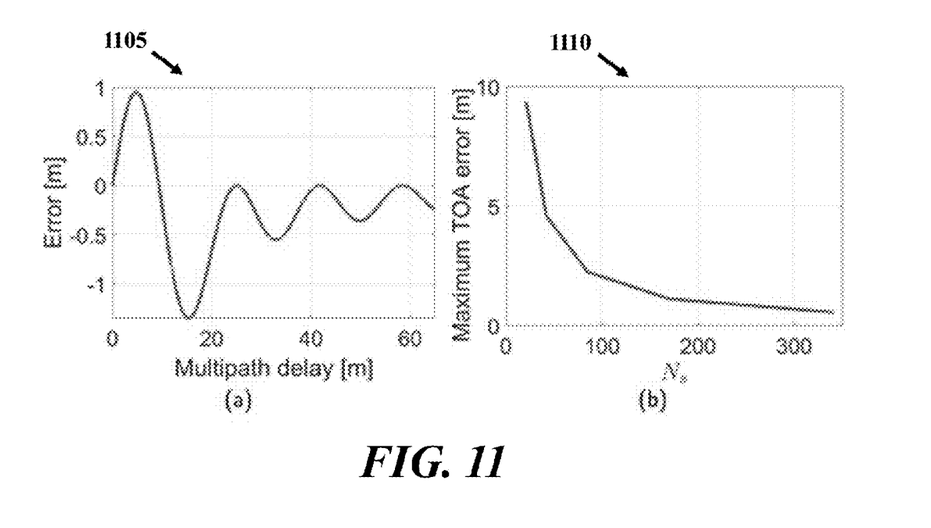
FIG. 11 illustrates TOA estimation error representations according to one or more embodiments.

FIG. 11 illustrates TOA estimation error representations according to one or more embodiments. TOA error for due to multipath is shown as 1105. It can be seen that multipath delay changes the error in TOA estimation. Amplitude of the maximum delay estimation error due to multipath for different Ns values is shown as 1110. It can be seen that increasing Ns reduces the TOA estimation error. In contrast to the ELL and ALL, the TOA estimation error due to the multipath only depends on the relative multipath delay with respect to the LOS TOA.

Cramer-Rao Lower Bound

Results of embodiment testing and simulation show that the Cramer-Rao lower bound of the estimated TOA an DOA are as follows:

$$\sigma^2_{\theta_0, CRLB} = \frac{6}{C/\sigma^2 MNN_s (\omega_c d/c)^2 \cos^2\theta_0} \frac{1}{[(N^2-1)\sin^2\phi_0 + (M^2-1)\cos^2\phi_0]},$$

$$\sigma^2_{\phi_0, CRLB} = \frac{6}{C/\sigma^2 MNN_s (\omega_c d/c)^2 \sin^2\theta_0}$$
$$\frac{1}{[(N^2-1)\cos^2\phi_0 + (M^2-1)\sin^2\phi_0]},$$

$$\sigma^2_{\tau_0, CRLB} = \frac{6}{C/\sigma^2 MNN_s (N_s^2 - 1)(2\pi f_s N_{CRS})^2}.$$

Based on the following, FOR M=N, the CRLBs of both azimuth and elevation angles are independent of the actual azimuth angle. The TOA CRLB does not depend on the DOA and TOA values.

Figure 12:
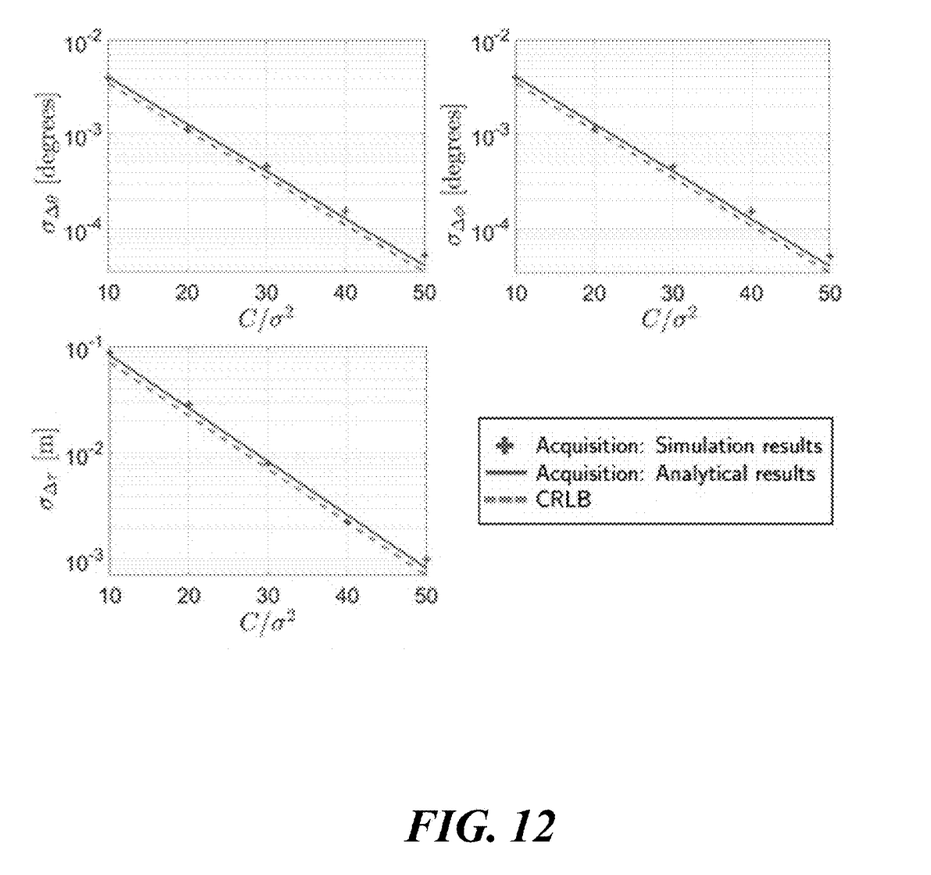
FIG. 12 illustrates acquisition and simulation results according to one or more embodiments.

FIG. 12 illustrates acquisition and simulation results according to one or more embodiments including CRLB and acquisition stage standard deviation. In FIG. 12, the CRLB and acquisition state standard deviation of elevation and azimuth angles and delay estimation errors for different C/o². The results are presented for M=N=N$_s$=32, P=K=R= [M/3], L=1, $\tau_0$=0, $\phi_0$=$\theta_0\pi/4$.

Navigation Framework

According to one embodiment, a navigation framework is provided. An extended Kalman filter (EKF) is proposed to estimate the location of the receiver using the estimated TOA and DOA. In one embodiment, the position estimate may be described as:

$$x \triangleq [r_r^T, x_{clk_1}^T, \ldots, x_{clk}^T]^T,$$

The system's dynamic model may be defined as $$x(k+1) = Fx(k) + \omega(k),$$

$$F = \begin{bmatrix} I_2 & 0_{2\times 2U} \\ 0_{2U\times 2} & F_{clk} \end{bmatrix},$$

$$F_{clk} = \text{diag}[F_{clk_1}, \ldots, F_{clk_u}],$$

$$F_{clk_u} = \begin{bmatrix} 1 & T_{sub} \\ 0 & 1 \end{bmatrix},.$$

The measurements may be modeled as $$\% \triangleq h(x) + v = \begin{bmatrix} \rho \\ \phi \end{bmatrix},$$

where $$\rho = [\rho^{(0)}, \ldots, \rho^{(U-1)}]^T,$$

$$\phi = [\Delta\phi^{(1)}, \ldots, \Delta\phi^{(U-1)}]^T, \text{ for } \Delta\phi^{(u)} \in [-\pi, \pi],$$

Where the measurement covariance matrix is defined as $$R = \begin{bmatrix} R_{TOA} & 0_{U\times U} \\ 0_{U-1\times U} & R_{DOA} \end{bmatrix},$$

Figure 13A:
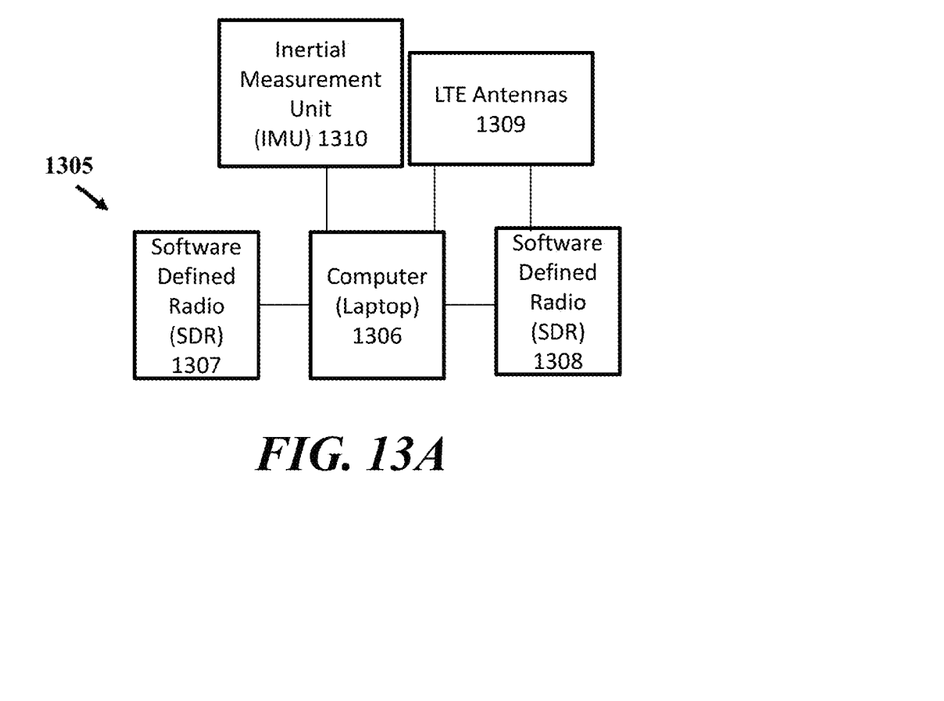
FIG. 13A illustrates an exemplary hardware setup according to one or more embodiments.

FIG. 13A illustrates an exemplary hardware setup according to one or more embodiments. To evaluate the performance of the proposed framework, a field test was conducted with real LTE signals in the Anteater parking structure at the University of California, Irvine, USA. This section presents the experimental setup and obtained results.

A. Hardware and Software Setup

FIG. 13A shows the experimental hardware setup 1305. To perform the experiment, a cart was equipped with Four consumer-grade 800/1900 MHz cellular omni-directional antennas 1309 to record LTE signals. The antennas 1309 were arranged in a 2×2 UPA array structure with d=7 cm. A four-channel universal software radio peripherals 1307 were employed to simultaneously down-mix and synchronously sample the LTE signals received by the four antennas at a sampling rate of 10 MSps and a carrier frequency of 1955 MHz. A host laptop computer 1306 was configured to store the samples for post-processing. A software radio 1308 and LTE antenna 1309 were configured to transmit a tone signal before performing the experiment to remove the initial phase offsets between different elements of the antenna array. A GPS antenna was employed to discipline an oscillator. A device including a dual antenna multi-frequency GNSS receiver with real-time kinematic (RTK) and micro electromechanical systems (MEMS) inertial measurement unit (IMU) 1310 was configured to estimate the position and orientation of the ground vehicle, which was used as the "ground truth."

Figure 13B:
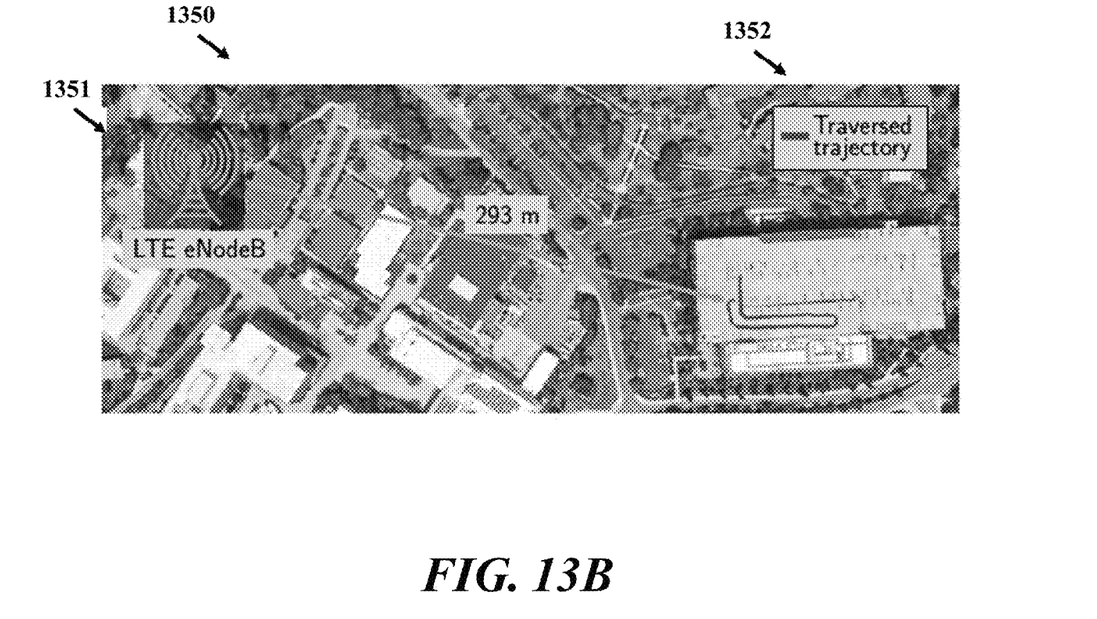
FIG. 13B illustrates a graphical representation of experimental trajectory according to one or more embodiments.

FIG. 13B illustrates an experimental trajectory. The location of the LTE eNodeB 1351, the traversed trajectory 1352, and the environmental layout of the experiment is shown as 1350. The receiver traversed a trajectory of 153 m over 180 s, while listening to 1 LTE eNodeBs. The true orientation of the receiver was obtained The stored LTE samples were used to jointly estimate the TOA and DOA of the received LTE signals using (1) only MP algorithm and (2) the proposed receiver structure. Then, the results were compared against the true value, which are shown in FIG. 14.

Figure 14:
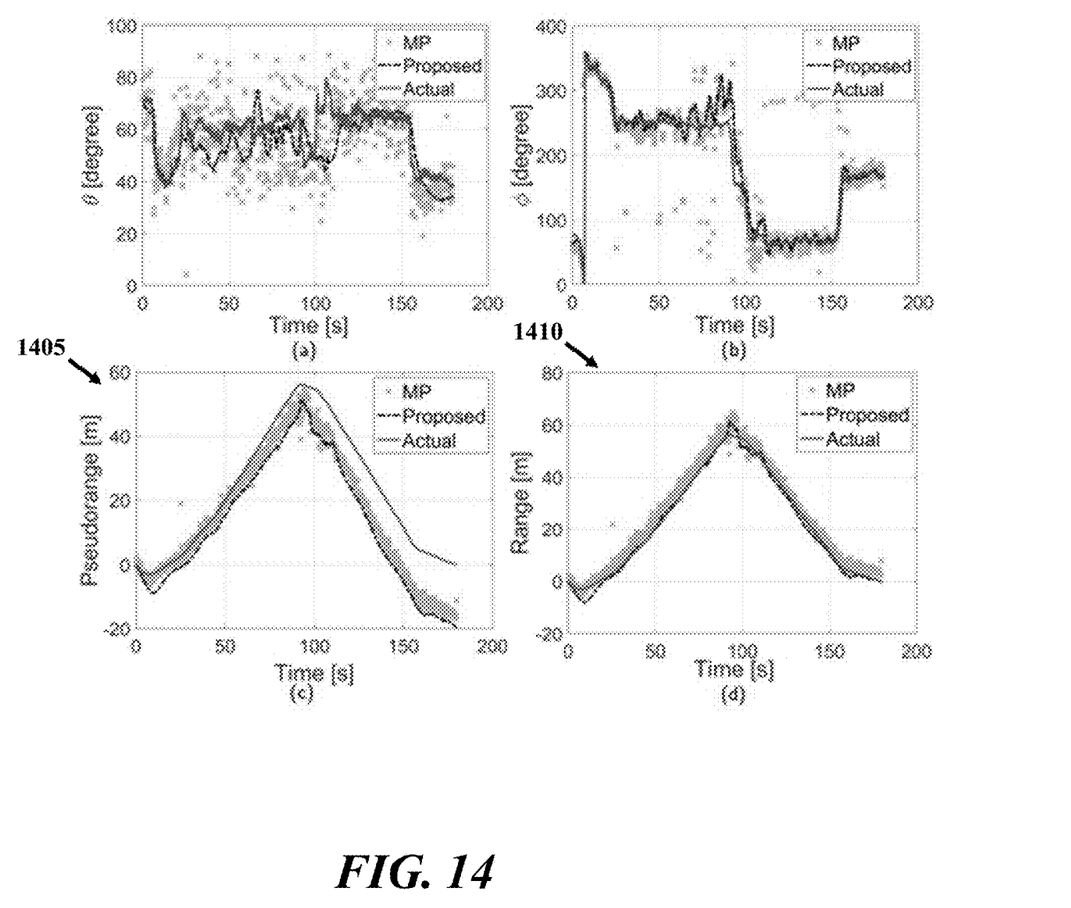
FIG. 14 illustrates estimated TOA and DOA determinations according to one or more embodiments.

FIG. 14 illustrates estimated TOA and DOA obtained by MP operations and a proposed receiver structure. A comparison of the estimated pseudoranges with the true range is shown as 1405. Note that the initial bias is removed from the range and pseudoranges for comparison purposes. The difference between the true range and the estimated pseudoranges are due to noise, multipath, and clock drift. In order to remove the effect of the clock, a linear function was mapped to the error, which represents a constant clock drift model. The estimated drift was −0.11 m/s. Then, this function was used to remove the effect of clock drift from the pseudoranges. Estimated ranges after removing the effect of the clock are shown as 1410. Table I compares the standard deviation of the TOA and DOA errors. It can be seen that a reduction of 93%, 57%, and 31% in the standard deviation of the estimated TOA, azimuth, and elevation angles errors, respectively, was achieved using the proposed receiver structure compared to the MP algorithm.

TABLE 1

STANDARD DEVIATION OF THE ESTIMATED TOA AND DOA ERRORS

|  | MP algorithm | Proposed algorithm |
| --- | --- | --- |
| Azimuth [degrees] | 43.21 | 18.62 |
| Elevation [degrees] | 11.49 | 7.89 |
| TOA [m] | 21.86 | 1.60 |

Note that the MDL method tends to overestimate the channel length. As a result, the MP algorithm has an outlier. Since pseudorange estimates are obtained by multiplying TOA estimates with the speed of light, this outlier tends to have large numbers, which results in large estimation error standard deviation. Note that the y-axis in FIG. 14 is limited for better visualization and does not show the outlier completely.

This disclosure described a developed receiver structure to jointly estimate the TOA and DOA of LTE signals. In the proposed receiver, the MP algorithm was used in the acquisition stage to obtain a coarse estimate of the TOA and DOA. Then, a tracking loop was proposed to refine these estimates and track their changes. The performance of each stage was analyzed in the presence of noise and multipath. The CRLBs of the TOA and DOA were derived to obtain the best-case performance. It was shown that the proposed receiver structure can significantly reduce the complexity of the MP algorithm. Simulation results were provided to demonstrate the analytical results and evaluate the performance. Experimental results with real LTE signals were presented showing that the proposed receiver structure can reduce the standard deviation of the estimated TOA, azimuth, and elevation angles errors by 93%, 57%, and 31%, respectively, compared to the MP algorithm.

While this disclosure has been particularly shown and described with references to exemplary embodiments thereof, it will be understood by those skilled in the art that various changes in form and details may be made therein without departing from the scope of the claimed embodiments.

What is claimed is:

1. A method for positioning using signals of opportunity based on joint time of arrival (TOA) and direction of arrival (DOA) acquisition and tracking, the method comprising:

receiving, by a device, at least one signal of opportunity;

performing, by the device, an estimation of time of arrival (TOA) and direction of arrival (DOA) for the at least one signal of opportunity, wherein the estimation of TOA and DOA is jointly determined by the device;

performing, by the device, signal tracking of TOA and DOA estimates for the at least one signal of opportunity, wherein the TOA and DOA estimates are refined based on an azimuth, elevation and delay locked-loops; and determining, by the device, a location for the device based on refined TOA and DOA estimates.

2. The method of claim 1, wherein the at least one signal of opportunity is a cellular long-term evolution (LTE) signal.

3. The method of claim 1, wherein the estimation of time of arrival (TOA) and direction of arrival (DOA) is performed using three-dimensional (3D) matrix pencil (MP) operations to jointly estimate two-dimensional (2D) DOA and TOA of a received signal of opportunity.

4. The method of claim 3, wherein the 3D MP operations jointly estimate TOA and DOA by constructing an estimated enhanced matrix, using pencil parameters to improve estimation and provide noise filtering, and wherein the enhanced matrix is decomposed using single value decomposition into signal and noise subspaces, and wherein the TOA is determined from the channel frequency response.

5. The method of claim 1, wherein the estimation of time of arrival (TOA) and direction of arrival (DOA) is performed using a cell-specific reference signal (CRS), and wherein a channel frequency response (CFR) is estimated using the CRS.

6. The method of claim 1, wherein the estimation of time of arrival (TOA) and direction of arrival (DOA) is performed using a uniform planar array having a plurality of antenna elements, and wherein phase difference of a received signal of opportunity is determined at each antenna element of the uniform planar array.

7. The method of claim 1, wherein signal tracking includes an elevation locked-loop tracking loop structure, an azimuth locked-loop tracking loop structure, and a delay locked-loop tracking loop structure, each loop structure configured to refine and track changes in TOA and DOA.

8. The method of claim 7, wherein each tracking loop structure includes a correlator receiving input from a reference signal generator and locked-lop configuration, each correlator generating an down and up correlation functions of a CFR as input to a discriminator operation.

9. The method of claim 1, wherein determining device location includes performing an extended Kalman filter (EFF) operation using determined TOA and DOA estimates.

10. The method of claim 1, further comprising controlling navigation using the location determined for the device.

11. A device configured for using signals of opportunity based on joint time of arrival (TOA) and direction of arrival (DOA) acquisition and tracking, the device comprising to a communications module configured to receive at least one signal of opportunity; and a controller, coupled to the communications module, wherein the controller is configured to perform an estimation of time of arrival (TOA) and direction of arrival (DOA) for the at least one signal of opportunity, wherein the estimation of TOA and DOA is jointly determined by the device;

perform signal tracking of TOA and DOA estimates for the at least one signal of opportunity, wherein the TOA and DOA estimates are refined based on an azimuth, elevation and delay locked-loops; and determine a location for the device based on refined TOA and DOA estimates.

12. The device of claim 11, wherein the signal of opportunity is a cellular long-term evolution (LTE) signal.

13. The device of claim 11, wherein the estimation of time of arrival (TOA) and direction of arrival (DOA) is performed using three-dimensional (3D) matrix pencil (MP) operations to jointly estimate two-dimensional (2D) DOA and TOA of a received signal of opportunity.

14. The device of claim 13, wherein the 3D MP operations jointly estimate TOA and DOA by constructing an estimated enhanced matrix, using pencil parameters to improve estimation and provide noise filtering, and wherein the enhanced matrix is decomposed using single value decomposition into signal and noise subspaces, and wherein the TOA is determined from the channel frequency response.

15. The device of claim 11, wherein the estimation of time of arrival (TOA) and direction of arrival (DOA) is performed using a cell-specific reference signal (CRS), and wherein a channel frequency response (CFR) is estimated using the CRS.

16. The device of claim 11, wherein the estimation of time of arrival (TOA) and direction of arrival (DOA) is performed using a uniform planar array having a plurality of antenna elements, and wherein phase difference of the received signal of opportunity is determined at each antenna element of the uniform planar array.

17. The device of claim 11, wherein signal tracking includes an elevation locked-loop tracking loop structure, an azimuth locked-loop tracking loop structure, and a delay locked-loop tracking loop structure, each loop structure configured to refine and track changes in TOA and DOA.

18. The device of claim 17, wherein each tracking loop structure includes a correlator receiving input from a reference signal generator and locked-lop configuration, each correlator generating an down and up correlation functions of a CFR as input to a discriminator operation.

19. The device of claim 11, wherein determining device location includes performing an extended Kalman filter (EFF) operation using determined TOA and DOA estimates.

20. The device of claim 11, further comprising controlling navigation using the location determined for the device.

* * * * *